United States Patent
Fröberg Olsson et al.

(10) Patent No.: US 9,668,266 B2
(45) Date of Patent: May 30, 2017

(54) INTERFERENCE CONTROL IN HETNETS

(75) Inventors: Jonas Fröberg Olsson, Ljungsbro (SE);
Håkan Andersson, Stockholm (SE);
Olle Rosin, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/412,596

(22) PCT Filed: Jul. 4, 2012

(86) PCT No.: PCT/SE2012/050778
§ 371 (c)(1),
(2), (4) Date: Jan. 2, 2015

(87) PCT Pub. No.: WO2014/007699
PCT Pub. Date: Jan. 9, 2014

(65) Prior Publication Data
US 2016/0007361 A1    Jan. 7, 2016

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0053* (2013.01); *H04L 5/0073* (2013.01);
(Continued)

(58) Field of Classification Search
CPC ............. H04W 72/042; H04W 72/082; H04W 72/1289; H04W 72/04; H04W 72/08; H04W 72/1278
See application file for complete search history.

(56) References Cited

U.S. PATENT DOCUMENTS

2011/0149894 A1* 6/2011 Luo ................. H04W 16/02
370/329
2011/0170496 A1   7/2011 Fong
(Continued)

FOREIGN PATENT DOCUMENTS

EP   2557831 A1   2/2013
EP   2566268 A1   3/2013
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.7.0, Mar. 2012, 1-194.

(Continued)

*Primary Examiner* — Feben M Haile
(74) *Attorney, Agent, or Firm* — Patent Portfolio Builders, PLLC (57) ABSTRACT

The embodiments herein relates to a method in a first base station (201*a*) for controlling interference on a second Physical Downlink Control CHannel, PDCCH (210*b*). The second PDCCH (210*b*) is between a second base station (201*b*) and a second user equipment (205*b*). The first base station (201*a*) receives (602), from the second base station (201*b*), coordination information associated with the second PDCCH (210*b*). Based on the received coordination information, the first base station (201*a*) controls (306, 405, 503, 505, 507, 603) the interference on the second PDCCH (210*b*), wherein the interference is caused by a first PDCCH (210*a*) from the first base station (201*a*) to a first user equipment (205*a*).

32 Claims, 7 Drawing Sheets

(51) Int. Cl.
  *H04W 72/04* (2009.01)
  *H04W 72/12* (2009.01)
  *H04W 52/24* (2009.01)

(52) U.S. Cl.
  CPC ........ *H04W 72/042* (2013.01); *H04W 52/244* (2013.01); *H04W 72/1289* (2013.01)

(56) References Cited

U.S. PATENT DOCUMENTS

| | | | | |
|---|---|---|---|---|
| 2012/0230211 A1* | 9/2012 | Sandberg | ............. | H04L 5/0053 370/252 |
| 2012/0258724 A1* | 10/2012 | Kim | .................... | H04W 72/082 455/452.2 |
| 2013/0121191 A1 | 5/2013 | Song et al. | | |
| 2014/0314042 A1* | 10/2014 | Kim | ..................... | H04L 1/0072 370/329 |

FOREIGN PATENT DOCUMENTS

| | | |
|---|---|---|
| WO | 2011085191 A1 | 7/2011 |
| WO | 2011085195 A1 | 7/2011 |
| WO | 2011126024 A1 | 10/2011 |
| WO | 2011126025 A1 | 10/2011 |
| WO | 2013066877 A1 | 5/2013 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 10)", 3GPP TS 36.212 V10.0.0, Dec. 2010, 1-72.

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, 1-101.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.0.0, Dec. 2010, 1-98.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 1-302.

Unknown, Author, "Considerations on interference coordination in heterogeneous networks", LG Electronics, 3GPP TSG RAN WG1 Meeting #59bis, R1-100236, Valencia, Spain, Jan. 18-22, 2010, 1-5.

Unknown, Author, "Interference coordination for control channels for HetNet", Fujitsu, 3GPP TSG-RAN WG1 Meeting #61, R1-103227, Montreal, Canada, May 10-14, 2010, 1-7.

Office Action in EP application No. 12880631.2 mailed Jun. 12, 2015.

* cited by examiner

Fig. 1: PCFICH, PHICH and PDCCH resource mapping

INTERFERENCE CONTROL IN HETNETS

TECHNICAL FIELD

Embodiments herein relate generally to a first base station and a method in the first base station. More particularly the embodiments herein relate to controlling interference on a second Physical Downlink Control Channel (PDCCH).

BACKGROUND

In a typical cellular network, also referred to as a wireless communication system, a User Equipment (UE), communicates via a Radio Access Network (RAN) to one or more Core Networks (CNs).

A user equipment is a device by which a subscriber may access services offered by an operator's network and services outside the operator's network to which the operator's radio access network and core network provide access, e.g. access to the Internet. The user equipment may be any device, mobile or stationary, enabled to communicate over a radio channel in the communications network, for instance but not limited to mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, hand held, computer comprised, or vehicle mounted mobile devices, enabled to communicate voice and/or data, via the radio access network, with another entity, such as for example another user equipment or a server.

User equipments are enabled to communicate wirelessly with the communications network. The communication may be performed e.g. between two user equipments, between a user equipment and a regular telephone and/or between the user equipment and a server via the radio access network and possibly one or more core networks and possibly the Internet.

The radio access network covers a geographical area which is divided into cell areas, with each cell area being served by a Base Station (BS), e.g. a Radio Base Station (RBS), which in some radio access networks is also called evolved NodeB (eNB), NodeB, B node or base station. A cell is a geographical area where radio coverage is provided by the base station at a base station site. Each cell is identified by an identity within the local radio area, which is broadcast in the cell. The base stations communicate over the air interface with the user equipments within range of the base stations.

A heterogeneous network is a network comprising multiple types of radio access technologies, architectures, transmission solutions, and base stations of varying transmission power. A high power node may also be referred to as a macro node and a low power node may be referred to as a micro or a pico node. Furthermore, a macro cell is a cell that provides radio coverage served by a high power node and a micro cell is a cell that provides radio coverage served by a low power node. A macro cell typically provides larger coverage than a micro cell. In a heterogeneous network deployment the base stations typically transmit with different power levels. This leads to imbalance problems around low power nodes since the high power node is selected as the serving cell due to a higher received signal strength in the user equipment although the pathloss to the low power node is lower. To offload the high power node and also improve the UpLink (UL) performance, a cell selection offset, also known as cell Range Expansion (RE), may be used. Uplink is defined as transmission from the user equipment to the base station. Downlink is defined as transmission from the base station to the user equipment.

When the range of the micro (low power) node is extended by the RE, the user equipments in the RE zone are heavily interfered by the macro node. This interference may be mitigated in the Third Generation Partnership Project (3GPP) release 10 using so called Almost Blank Subframes (ABS), where certain SubFrames (SF) are protected, referred to as PSF (Protected SF) meaning that the macro node is not allowed to transmit user data in those SF. In a PSF the macro node is allowed to transmits some control information and system information, but it is not allowed to transmit any user data. The ABS pattern is a 40-bit string where each bit corresponds to a subframe. This may be referenced to a parameter called MeasSubframePattern. ABS may be seen as a special case of Reduced Power Subframes (RPS), where the macro node is allowed to transmit with reduced power in the PSF. Normal SF will be referred to as non-PSF. Summarized, in 3GPP release 10, the macro node is not allowed to send any uplink grants scheduling a user equipment on the Physical Uplink Shared Channel (PUSCH), and/or uplink Transmit Power Control (TPC) commands for PUCCH/PUSCH and/or downlink assignments scheduling a user equipment on the PDSCH in a PSF. In RPS, the macro node may send uplink grants, uplink TPC commands and downlink assignments in the PSF, but with reduced power. PUCCH is short for Physical Uplink Control Channel and PDSCH is short for Physical Downlink Shared Channel.

In Long Term Evolution (LTE), the PDCCH transports downlink control information and is primarily used to transmit downlink assignments, i.e. assigns downlink resources for the base station to transmit on, scheduling a user equipment for downlink transmission on the PDSCH, and uplink grants, scheduling a user equipment for transmission on the PUSCH, i.e. assigns uplink resources for the user equipment to transmit on. A PDCCH is transmitted using an aggregation of one or several consecutive Control Channel Elements (CCEs), where a control channel element corresponds to 9 resource element groups. Each resource element group in turn comprises 4 resource elements. The PDCCH is transmitted in the first n Orthogonal Frequency Division Multiple Access (OFDM) symbols where n≤4. Link adaptation for PDCCH is achieved by selecting a discrete CCE aggregation level: 1, 2, 4 or 8 in order to achieve a certain code rate based on the Downlink Control Information (DCI) transport block size that is transmitted on the PDCCH.

The Physical Control Format Indicator Channel (PCFICH) carries information about the number of OFDM symbols used to transmit PDCCH information in a subframe. The PDCCH may be configured to transmit using OFDM symbols depending on the bandwidth, duplex configuration (FDD or TDD configuration 0-6), MBSFN configuration and antenna configuration. Duplexing refers to the way downlink and uplink data is arranged in a two-way wireless transmission. There are two types of duplexing schemes: FDD and TDD, where FDD is short for Frequency Division Duplexing and TDD is short for Time Division Duplexing. MBSFN is short for Multicast Broadcast Single Frequency Network and relates to synchronized transmission from multiple cells. MBSFN is seen as a multipath propagation by the user equipment.

The Physical Hybrid ARQ Indicator Channel (PHICH) is used to transmit hybrid-ARQ (HARQ) ACK/NACKs. Multiple PHICHs are mapped to the same set of resource elements and constitute a PHICH group which each is constituted of 3 bits.

As mentioned above, when transmitting data on the downlink, the number of OFDM symbols used to transmit the control channels may be specified in order for the receiver to know where to find control information. CFI is short for Control Format Indicator and is a parameter which defines the time span, in OFDM symbols, of the PDCCH transmission for a particular downlink subframe. The CFI is transmitted using the PCFICH. The CFI is limited to the values 1, 2, 3 or 4. For bandwidths greater than ten resource blocks, the number of OFDM symbols used to contain the downlink control information is the same as the actual CFI value. Otherwise the span of the downlink control information is CFI+1 symbols. Each subframe has a time duration of 14 time slots. In OFDM, the frequency band utilized is divided into subcarriers. This means that the information is transmitted on a time frequency grid, where each entry in the grid corresponds to one subcarrier in one time slot. An entry in the grid is referred to as a resource element. A resource block (or, more precisely resource block pair) typically (for normal cyclic prefix) comprises the resource elements in 12 consecutive subcarriers and 14 consecutive time slots.

The PCFICH, PHICH and PDCCH are all mapped to resource elements inside the downlink control region, which spans the whole bandwidth with an OFDM symbol duration corresponding to the CFI transmitted on PCFICH. The PCFICH is always mapped to the first OFDM symbol, but shifted in frequency based on the cell index. Both PHICH and PDCCH data is mapped to resource elements in all OFDM symbols in the control region in order to provide time and frequency diversity. They are also both subject to interleaving and scrambling.

Figure 1:
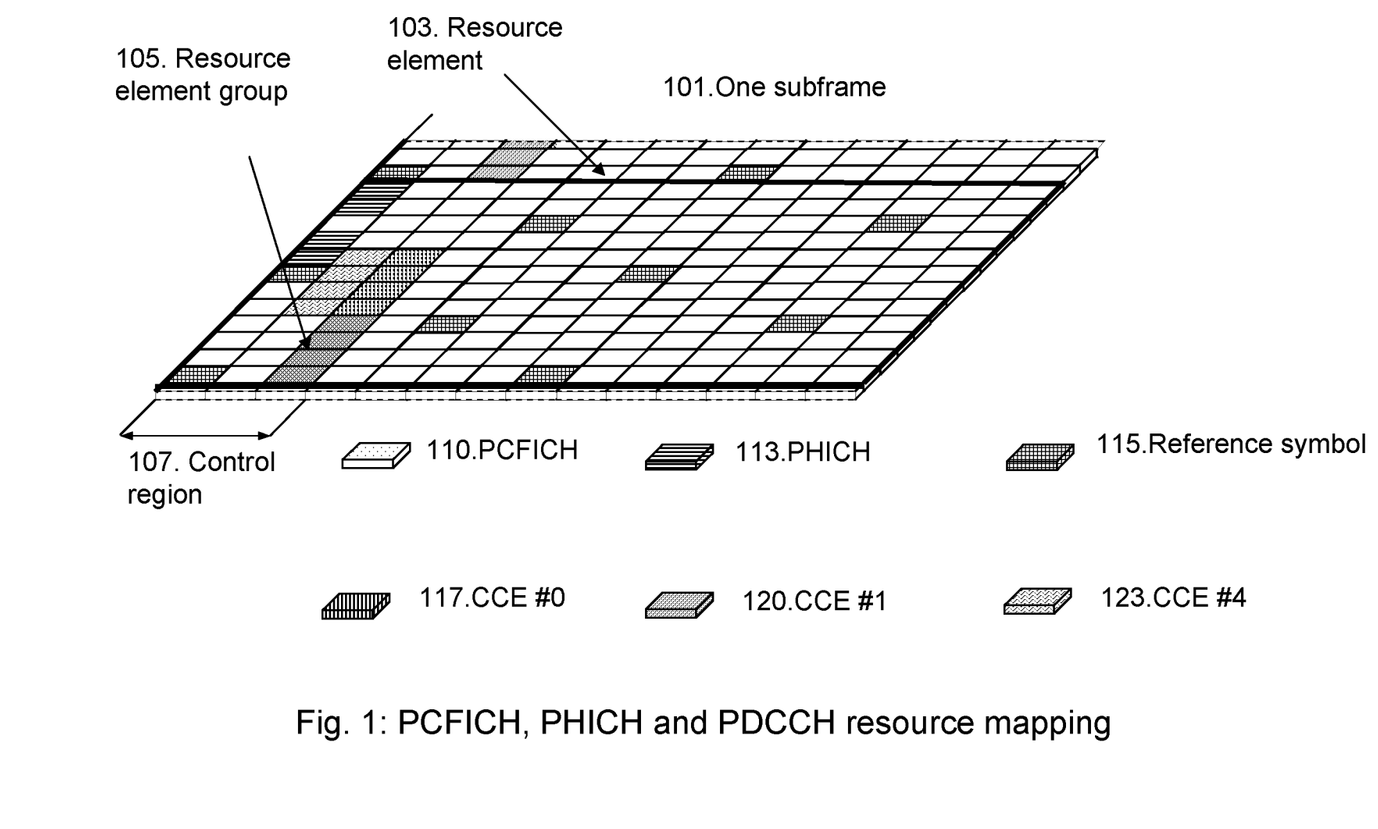
FIG. 1 is a schematic drawing illustrating PCFICH, PHICH and PDCCH resource mapping.

A conceptual illustration of mapping of a control data resource element in the downlink using two downlink antenna ports is illustrated in FIG. 1, illustrating how the PDCCH and other control data (PCFICH and PHICH) are mapped to different resource elements scattered in frequency and time inside a control region. In FIG. 1, one subframe 101 is illustrated for a subset of the total bandwidth. A subframe is divided into resource elements 103 and a resource element group 105 comprises, as mentioned above, four resource elements 103. The control region 107 comprises, in this case, the first three OFDM symbols. The PCFICH 110 is illustrated as a box with dots, the PHICH 113 is illustrated as a box with horizontal lines and a reference symbol 115 is illustrated as a box with squares. The CCE#0 117 is illustrated, in FIG. 1, with a box with sloping lines, the CCE#1 is illustrated with a box with sloping squares and the CCE#4 is illustrated with a box with waved formed lines. The thick line in FIG. 1 represents a resource block pair.

In the PSF, when ABS is used, neither the PDSCH nor the PDCCH transmission is allowed. This means that not only the downlink performance is affected, but also the uplink since no uplink grant may be sent on the PDCCH. The uplink performance will thus be degraded to the same extent as the downlink. Similarly, for RPS the PDSCH and PDCCH may only be transmitted with reduced power which means that a user equipment located far out in the macro cell may not be reached by neither PDCCH nor PDSCH. For the uplink this may be a severe restriction for power limited user equipments that may not fully utilize the available bandwidth when they are scheduled. It is often beneficial to schedule such power limited user equipments frequently with small bandwidth allocations rather than scheduling large bandwidth allocations more infrequently. In this scenario, ABS/RPS may cause severe limitation in terms of uplink performance.

SUMMARY

An object of embodiments herein is therefore to obviate at least one of the above disadvantages and to provide improved interference control in the communications network.

According to a first aspect, the object is achieved by a method in a first base station for controlling interference on a second PDCCH. The second PDCCH is between a second base station and a second user equipment. The first base station receives, from the second base station, coordination information associated with the second PDCCH. Based on the received coordination information, the first base station controls the interference on the second PDCCH. The interference is caused by a first PDCCH from the first base station to a first user equipment.

According to a second aspect, the object is achieved by a first base station for controlling interference on the second PDCCH. The second PDCCH is between the second base station and the second user equipment. The first base station comprises a receiver which is configured to receive, from the second base station, coordination information associated with the second PDCCH. The first base station comprises a controller which is configured to based on the received coordination information, control the interference on the second PDCCH. The interference is caused by a first PDCCH from the first base station to a first user equipment.

Embodiments herein afford many advantages, of which a non-exhaustive list of examples follows:

An advantage of embodiments herein is that PDCCH transmissions are protected in scenarios with otherwise severe interference. The embodiments herein may be applied both stand-alone or on top of ABS/RPS. The uplink performance is improved compared to normal ABS/RPS operation in a macro cell since the macro user equipments may be scheduled in PSF (ABS scenario) or reach user equipments further out in the macro cell (RPS scenario).

Another advantage of the embodiments herein is that the PDCCH interference avoidance reduces the impact of PDCCH interference by prioritizing PDCCHs to be transmitted on CCE indices that causes minimal interference on cells interfered by the transmitting cell.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to sending PDCCH with higher power and limiting the induced interference by limiting the load on the PDCCH. This is done by either limiting the CFI and/or limiting the number of grants and/or number of assignments and/or number of TPC commands sent on the PDCCH. In PSF the micro base station tries to reduce the impact of macro PDCCH interference by increasing the CFI and increasing the number of CCEs utilized for the PDCCH. In more detail, the embodiments herein relates to exchanging information relating to how the CCEs are mapped on the control region in order to know how to avoid (in a first base station) mappings that cause "high" interference on a second PDCCH (in a second base station) and how to select mappings (or schedulings) that get low interference on the second PDCCH.

The embodiments herein are applicable to the case of ABS/RPS and may also be applied stand-alone, enabling PDCCH transmission in scenarios that otherwise may cause severe interference. In a stand-alone scenario, the PSF case will correspond to the subframes where the micro node need to be resilient to interference caused by PDCCH transmissions from the macro node and the non-PSF case will correspond to the subframes where the micro node needs no interference protection from PDCCH transmissions from the macro node.

Figure 2:
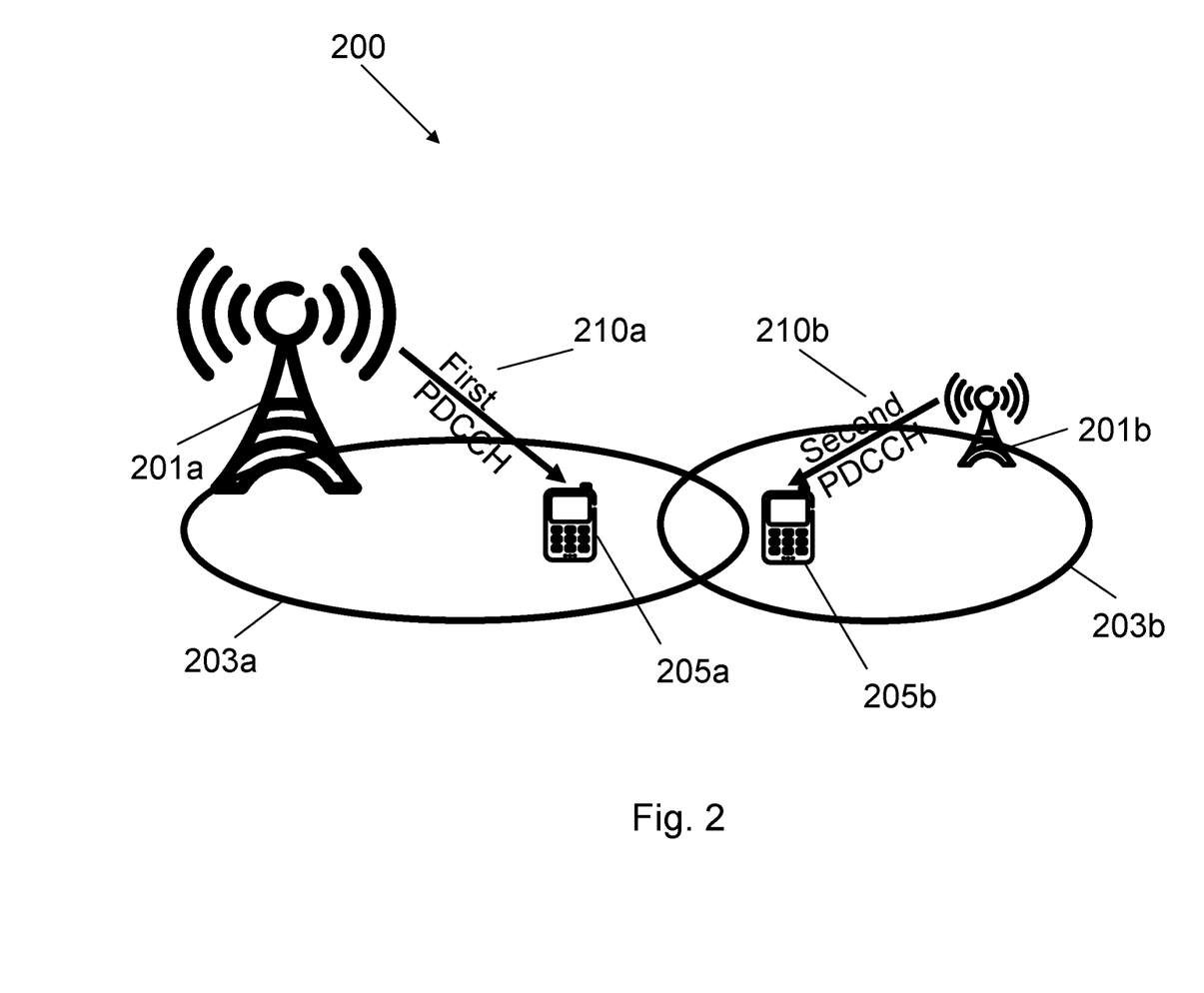
FIG. 2 is a schematic drawing illustrating embodiments of a communications network.

FIG. 2 depicts a communications network 200 in which the embodiments related to CFI based robustness coordination of PDCCH may be implemented. The communications network 200 may in some embodiments apply to one or more radio access technologies such as for example LTE, LTE Advanced, Wideband Code Division Multiple Access (WCDMA), Global System for Mobile Communications (GSM), or any other 3GPP radio access technology, or other radio access technologies such as for example Wireless Local Area Network (WLAN).

The communications network 200 comprises a first base station 201a serving a first cell 203a. The first base station 201a may be a base station such as a NodeB, an eNB, or any other network unit capable to communicate with a first user equipment 205a being present in the first cell 203a. The first base station 201a is a macro base station or a micro base station. A first PDCCH 210a is between the first user equipment 205a and the first base station 201a. The first user equipment 205a may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC. The first user equipment 205a may be portable, pocket storable, hand held, computer comprised, or vehicle mounted user equipments, enabled to communicate voice and/or data, via the radio access network, with another entity, such as for example another user equipment or a server. The first user equipment 205a is referred to as first UE in some of the figures.

The communications network 200 further comprises a second base station 201b serving a second cell 203b. The second base station 201b may be a base station such as a NodeB, an eNB, or any other network unit capable to communicate with a second user equipment 205b being present in the second cell 203b. The second base station 201b is a macro base station or a micro base station. A second PDCCH 210b is between the second user equipment 205a and the second base station 201b. The second user equipment 205b may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC. The second equipment 205b may be portable, pocket storable, hand held, computer comprised, or vehicle mounted user equipments, enabled to communicate voice and/or data, via the radio access network, with another entity, such as another user equipment or a server. The second user equipment 205b is referred to as second UE in some of the figures.

In the following, when the reference number 201 is used without the letters a or b, it refers to a base station in general. When the reference number 203 is used without the letters a or b, it refers to a cell in general. When the reference number 205 is used without the letters a or b, it refers to a user equipment in general. When the reference number 210 is used without the letters a or b, it refers to a PDCCH in general.

On the first PDCCH 210a and the second PDCCH 210b, downlink assignments and/or uplink grants and/or UL TPC commands are transmitted to the first user equipment 205a and the second user equipment 205b. The first user equipment 205a and the second user equipment 205b decode the first PDCCH 210a and the second PDCCH 210b, respectively.

In some embodiments, the first PDCCH 210a from the first base station 201a to the first user equipment 205a causes interference on the second PDCCH 210b, which is between the second base station 201b and the second user equipment 205b. In some embodiments, the first base station 201a is a macro base station and the second base station 201b is a micro base station. In some embodiments, the first base station 201a is a micro base station and the second base station 201b is a macro base station.

In the following, PSF is a subframe in which the first base station 201a and the second base station 201b performs the embodiments herein in order to reduce/avoid interference on the second PDCCH 210b. In other words, a PSF is a subframe where transmission from the second base station 201b is to be protected from interference.

The method for controlling interference on the second PDCCH 210b, seen from the perspective of the first base station 201a when it is a macro base station, according to some embodiments will now be described with reference to the flowchart depicted in FIG. 3. The flowchart in FIG. 3 exemplifies the scheduling of one user equipment 205, however scheduling of a plurality of user equipments 205 is also applicable. The method comprises the following steps, which steps may as well be carried out in another suitable order than described below:

Step 301

The first (macro) base station 201a determines if the subframe in which the first PDCCH 210a is to be transmitted in is a protected subframe or not. In case the subframe is not a protected subframe, indicated with "no" in FIG. 3, the method proceeds to step 302. In case the subframe is a protected subframe, indicated with "yes" in FIG. 3, the method proceeds to step 303.

In the embodiments herein, a PSF is a subframe in which second base station 201b is to expect lower interference on the PDCCH and the PDSCH. Thus the "definition" of PSF in the prior art has been extended to a subframe where second base station 201b is to expect lower interference than in a non-PSF. However, the second base station 201b may not expect first base station 201a to be "silent".

Step 302

This step is performed when the determination in step 301 resulted in that the subframe is not a protected subframe. The first (macro) base station 201a performs a normal operation with a normal CFI selection and a normal PDCCH link adaptation. Normal CFI selection means that the CFI is set to a number that corresponds to the number of desired/required OFDM symbols based on the scheduling decision. If it is necessary to schedule many user equipments 205, a higher CFI may be required. The size of the CFI is dependent on the number of available CCEs and the number of user equipment's 205 to be scheduled. If it is necessary to schedule for example only a single user equipment 205, the CFI=1 might be sufficient. Normal PDCCH link adaption implies that uplink grants and/or downlink assignments and/or uplink TPC commands may be scheduled (not considering step 304) without applying any method to reduce interference other than what is already in the standard.

Step 303

This step is performed when the determination in step 301 resulted in that the subframe is a protected subframe. This step 303 is performed instead of step 302. When the subframe is a protected subframe the first (macro) base station 201a sets the CFI to a minimum number of OFDM symbols, for example CFI=1.

The minimum number of OFDM symbols for PDCCH depends on system bandwidth, frame structure and subframe.

Step 303 reduces interference on the second PDCCH 210b since by limiting the CFI to 1 the interference on second PDCCH 210b will only occur in first OFDM symbol.

Step 304

After the CFI is set to the minimum number of OFDM symbols, the first (macro) base station 201a determines whether it is configured to send an uplink grant and/or downlink assignment and/or uplink TPC command or not. That the first (macro) base station 201a is configured to send an uplink grant and/or downlink assignment and/or uplink TPC command may mean that:
  i) Only an uplink grant and/or an uplink TPC command is allowed in the case that step 304 is a test if the scheduling is for an uplink grant and/or uplink TPC command; or
  ii) When uplink grant and/or downlink assignment and/or uplink TPC commands are allowed, then the step 304 is a step of checking if this configuration is enabled.

Step 305

Figure 3:
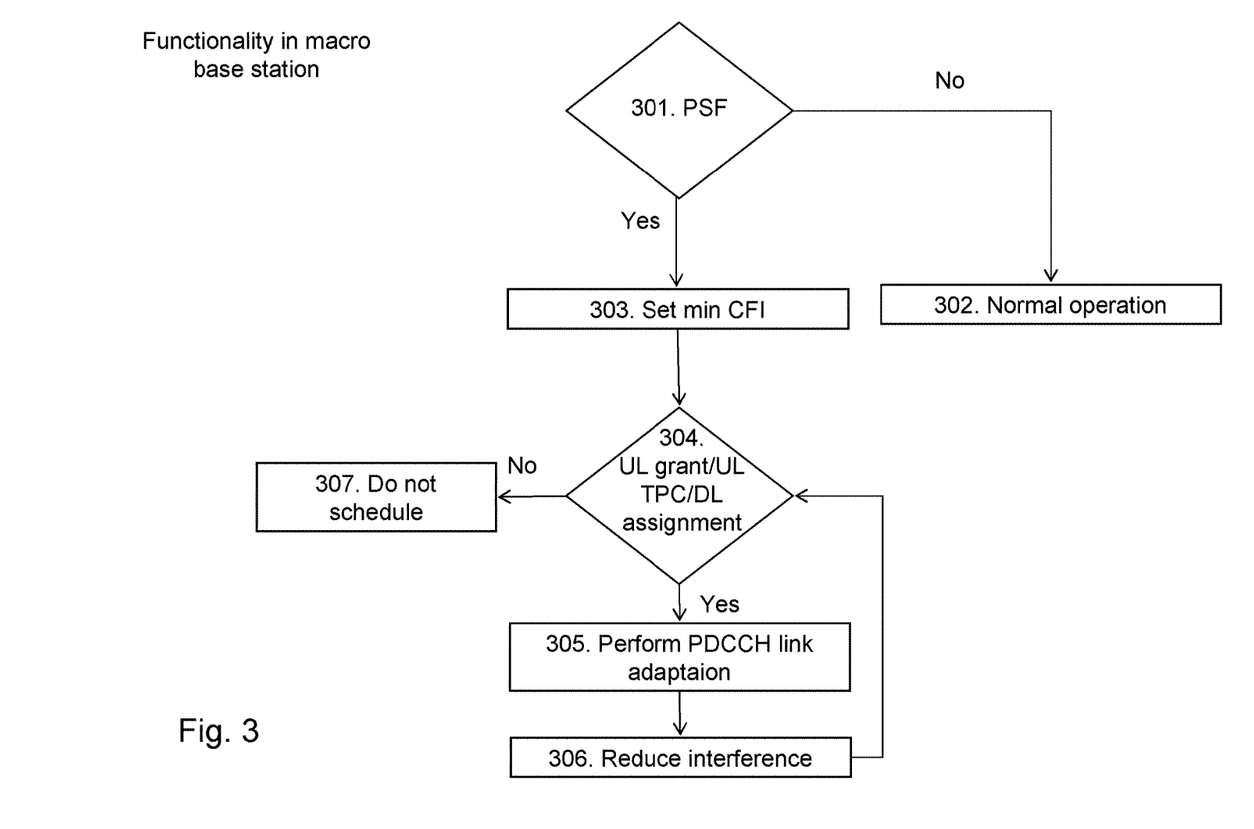
FIG. 3 is a flow chart illustrating embodiments of a macro operation.

When step 304 resulted in that the first (macro) base station 201a determined that it is configured to send an uplink grant and/or downlink assignment and/or uplink TPC command, indicated with "yes" in FIG. 3, the first (macro) base station 201a performs a normal PDCCH link adaptation.

Step 306

The first (macro) base station 201a reduces the interference on the second PDCCH 210b. This interference is induced by or caused by the first PDCCH 210a from the first (macro) base station 201a to the first user equipment 205a. After step 306 is performed, the method returns to step 304.

If avoiding interference is desired by setting the CFI, nothing is done in step 306. However if selecting CCE indices is performed in such a way as to reduce interference between cells this step 306 would imply the actual scheduling/selection of which CCEs to be used before transmission is done. This may also involve reducing power on the PDSCH when downlink assignments may be allowed. Also, limiting the allocation size on PDSCH may be done.

When the meaning of that the first (macro) base station 201a is configured to send an uplink grant and/or downlink assignment and/or an uplink TPC command is as indicated in item ii) the reducing in this step 306 comprises either or both transmission of PDSCH with reduced power or limiting the frequency allocation for PDSCH. When that is not done, then the second PDCCH 210b will still see "full interference" where the interference comes from the first PDCCH 210a transmission and the first PDSCH transmission.

In a PSF, the first (macro) base station 201a reduces interference on the second PDCCH 210b by means of reducing CFI and/or limiting the load in the control region where the second PDCCH 210b is transmitted.

Step 307

When step 304 resulted in that the first (macro) base station 201a determined that it is not configured to send an uplink grant and/or downlink assignment and/or an uplink TPC command, indicated with "no" in FIG. 3, the first (macro) base station 201 does not schedule the first user equipment 205a on the first PDCCH 210a. Step 307 is performed instead of step 305.

The method for controlling interference on the second PDCCH 210b, seen from the perspective of the first base station 201a when it is a micro base station, according to some embodiments will now be described with reference to the flowchart depicted in FIG. 4. The method comprises the following steps, which steps may as well be carried out in another suitable order than described below:

Step 401

The first (micro) base station 201a determines if the subframe is a protected subframe or not. In case the subframe is not a protected subframe, indicated with "no" in FIG. 4, the method proceeds to step 402. In case the subframe is a protected subframe, indicated with "yes" in FIG. 4, the method proceeds to step 403.

Step 402

This step is performed when the determination in step 401 resulted in that the subframe is not a protected subframe. The first (micro) base station 201a selects and performs a normal operation with a normal CFI selection and a normal PDCCH link adaptation. A normal operation may be that the first (micro) base station 201a may not assume that its PDCCH transmissions will experience lower interference. This means that the first (micro) base station 201a may take actions involving scheduling (do not schedule the user equipment 205 that likely is sensitive to interference) and/or link adaptation (selecting more robust format, may involve both PDCCH and PDSCH).

Step 403

This step is performed when the determination in step 401 resulted in that the subframe is a protected subframe. This step 403 is performed instead of step 402. When the subframe is a protected subframe, the first (micro) base station 201a sets the CFI to a higher number of OFDM symbols than what would be used in normal operation, for example CFI=3. In other words the CFI may be set in range [min (CFI_Normal_OP, CFI_Max), CFI_Max], where CFI_Normal_OP is the CFI value which may have been used in "normal operation" and CFI_Max is the maximum allowed CFI. The higher number of OFDM symbols for PDCCH depends on the system bandwidth, the frame structure and the subframe. The higher number of CCEs for a user equipment on PDCCH may be 8. To use all available CCEs several user equipments 205 may need to allocate resources on PDCCH 210.

Step 404

This step is performed after step 403. The first (micro) base station 201a performs PDCCH link adaptation with an additional adjustment offset.

The additional adjustment offset for the first PDCCH 210a may be an offset in terms of CCEs and/or a Signal to Interference plus Noise Ratio (SINR) offset term in the link adaption function selecting the number of CCEs to use. Thus, the link adaptation in PSF may select the number of CCEs according to:

$$N_{PSF}=N_{non\text{-}PSF}+\text{Offset}_{PSF},$$

where $N_{PSF}$ and $N_{non\text{-}PSF}$ are the numbers of CCEs in PSF and non-PSF, respectively. The additional offset $\text{Offset}_{PSF}$ is thus an integer offset to the selected number of CCEs.

Another alternative with a SINR offset may be chosen as $$SINR_{PSF}=SINR_{non\text{-}PSF}+\text{OffSet}_{PSF},$$

where $SINR_{PSF}$ and $SINR_{non\text{-}PSF}$ are the estimated SINR in PSF and non-PSF, respectively. The additional is in this case real valued. The number of selected CCEs may be the result of a function $N_{CCE}(SINR)$ mapping from SINR to a number of CCEs.

Yet another alternative for the offset is to use a dynamic offset that is controlled by Discontinuous Transmission (DTX) detection of expected uplink PUSCH/PUCCH transmissions, e.g. downlink ACK/NACKs and/or uplink PUSCH transmissions.

Step 405

The first (micro) base station 201a reduces the interference on the second PDCCH 210b. This interference is induced by or caused by the first PDCCH 210a from the first (micro) base station 201a to the first user equipment 205a.

The interference may be further caused by a first PDSCH from the first base station 201a to a first user equipment 205a. The interference on the second PDCCH 210b is controlled by restricting the transmission of the first PDSCH on the bandwidth or by transmitting the first PDSCH with a reduced power.

The method for controlling interference on the second PDCCH 210b, seen from the perspective of the first base station 201a when it is a macro base station, according to some embodiments will now be described with reference to the flowchart depicted in FIG. 5. In the embodiments illustrated in FIG. 5, related to PDCCH load limited coordination, the first (macro) base station 201a is only allowed to allocate PDCCHs with full power in PSF up to a certain load level. The load level is a number $N_{CCE}$ of utilized CCEs. The value $N_{CCE}$ in PSF is typically lower than the total number of available CCEs. The second base station 201b, when it is a micro base station, chooses the same operation as in the embodiment described in FIG. 4 above. The first (macro) base station 201a may use reduced power in a RPS and may in addition only be allowed to allocate CCEs for its PDCCHs up to a certain load level.

The first (macro) base station 201a performs the following steps when allocating or scheduling PDCCH resources, which steps may be performed in any other suitable order than described below:

Step 501

The first (macro) base station 201a determines if the subframe is a protected subframe or not. In case the subframe is not a protected subframe, indicated with "no" in FIG. 5, the method proceeds to step 502. In case the subframe is a protected subframe, indicated with "yes" in FIG. 5, the method proceeds to step 503.

Step 502

This step is performed when the determination in step 501 resulted in that the subframe is not a protected subframe. The first (macro) base station 201a performs a normal operation with a normal CFI selection and a normal PDCCH link adaptation. Step 502 may comprise a step which is similar to step 403 shown in FIG. 4, where the CFI is reduced. As mentioned above, $N_{CCE}$ may be a function of the CFI. The first (macro) base station 201a may maintain a $N_{CCE}$ per possible CFI. The scheduling may then stop when there is no CFI for which an additional user equipment 205 may be added/scheduled.

Step 503

This step is performed when the determination in step 501 resulted in that the subframe is a protected subframe. This step 503 is performed instead of step 502. The first (macro) base station 201a sets the $N_{CCE}<=$Number of available CCEs in current subframe. The first (macro) base station 201a sets i=0. $n_{CCE}(i)$ denotes the number of required CCEs for the first user equipment 205a, e.g. for the first user equipment 205a number i, where i is a positive integer. By setting $N_{CCE}$ to a number which is lower than the available number of CCEs, the interference induced by the first (macro) base station 201a is reduced.

The interference may be further caused by a first PDSCH from the first base station 201a to a first user equipment 205a. The interference on the second PDCCH 210b is controlled by restricting the transmission of the first PDSCH on the bandwidth or by transmitting the first PDSCH with a reduced power.

Step 504

The first (macro) base station 201 performs PDCCH link adaptation which gives the $n_{CCE}(i)$.

Step 505

This step is performed after step 504. The first (macro) base station 201a determines whether $n_{CCE}(i)<=N_{CCE}$ or whether $n_{CCE}(i)>N_{CCE}$.

Step 506

This step is performed when the first base station 201a determined in step 505 that the $n_{CCE}(i)<=N_{CCE}$. When $n_{CCE}(i)$ CCEs for the user equipment 205 number i may be allocated in the available search spaces, then the first (macro) base station 201a allocates PDCCH resources to the first user equipment 205a, e.g. user equipment 205 i, and sets $N_{CCE}=N_{CCE}-n_{CCE}(i)$. After step 505 is performed, the method returns to step 505.

Step 507

This step is performed when the first (macro) base station 201a determined in step 505 that the $n_{CCE}(i)>N_{CCE}$, and then the first (macro) base station 201a stops scheduling PDCCH resources This step 507 is performed instead of step 506.

The total number of CCEs available depends on the system bandwidth, CFI (i.e. the number of OFDM symbols for PDCCH 210), configured cyclic prefix and PHICH configuration. In some embodiments where the communications network 200 has a particular system configuration (bandwidth, cyclic prefix, PHICH), the number of available CCEs is a function M(CFI). This means that the limitation $N_{CCE}$ may, for these embodiments, be a function of the CFI. The algorithm above need to be slightly more complex where CFI needs to be selected as well. One possible extension of the algorithm may be to first start with CFI=1 and then in steps add an option to increase the CFI when the macro base station wants to schedule more user equipments 205 on the PDCCH 210.

In some embodiments where the communications network 200 has a particular system configuration the number of available CCEs is 8, 25 and 41 for CFI=1, 2 and 3, respectively. One possible load limitation of the PDCCH that allows different choices for the CFI may be as shown in Table 1 below.

TABLE 1

Number of allowed CCEs in PSF for different CFI

| CFI | $N_{CCE}$ |
|---|---|
| 1 | 8 |
| 2 | 16 |
| 3 | 24 |

In some embodiments, CFIs taken from sets {1, 2, 3} (as in Table 1), {1, 2}, {2}, {2, 3} and {2, 3, 4}, may be used. As previously mentioned the allowed CFI values depend on system bandwidth, frame structure and subframe. In future releases of the 3GPP specifications more combinations may be allowed.

In some embodiments of the macro base station and the micro base station, the PDCCH interference is reduced or avoided by the first base station 201a and the second base station 201b exchanging PDCCH configuration information and CCE allocation patterns. By the term exchange of PDCCH configuration, this may for example comprise one or multiple of the following parameters affecting the mapping from CCE indices to physical resource elements:
  Cell index.
  Number of resource blocks.
  Number of sub-carriers per resource block.
  Number of antenna ports at the base station.
  CFI (Number of OFDM symbols that spans the control region).
  Cyclic prefix (Normal or extended).
  PHICH duration (Number of OFDM symbols in the control region used for PHICH transmission).
  PHICH nG factor (Parameter used to derive the number of PHICH groups).
  Duplex mode (FDD or TDD configuration 0-6).

In addition to the above list, the configuration information may comprise information about pairs (e.g. subsets of RNTIs, subframes) indicating which RNTIs that are candidates to be scheduled in a particular subframe. The receiver of the configuration information may then create its own pairs (e.g. subset of RNTIs, subframe) which gives lower interference for the particular subframe when a RNTI in a subset is selected for scheduling, compared to when no restriction is performed. RNTI is an abbreviation for Radio Network Temporary Identifier, and is an ID used by the base station 201 to identify the user equipment 205 in the cell 203.

By making interfering cells 203 aware of the PDCCH configuration used in another macro cell or micro cell, the inverse of the CCE to physical resource element mapping function may be derived for the interfering cells based on the associated PDCCH configuration. Hence, the selection of CCE indices may be done in an interference aware manner by exchanging CCE allocation patterns used to prioritize which CCEs to be scheduled or be used to reduce or completely prevent CCE allocation of CCE indices that corresponds to interfering physical resource elements (mutual exclusion). The exchange of PDCCH configuration and CCE allocation patterns may be transmitted between different base stations 201 using a backhaul, system information or it may be predefined.

Figure 6:
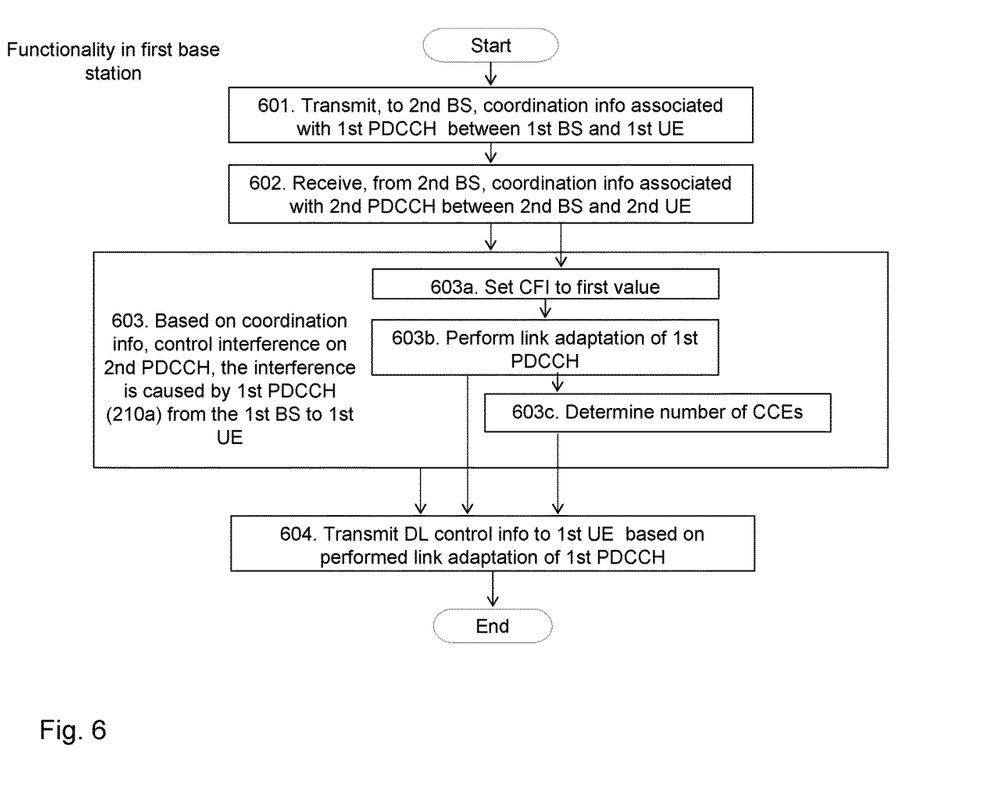
FIG. 6 is a flow chart illustrating embodiments of a method in a first base station.

The method described above will now be described seen from the perspective of the first base station 201a. FIG. 6 is a flowchart describing the method in the first base station 201a, for controlling interference on the second PDCCH 210b. As mentioned above the second PDCCH 210b is between a second base station 201b and a second user equipment 205b. In some embodiments, the first base station 201a is a macro base station and the second base station 201b is a micro base station. In some embodiments, the first base station 201a is a micro base station and the second base station 201b is a macro base station. Even though FIG. 6 describes an embodiment comprising two base stations, where the first base station 201a disturbs the second base station 201b, the method is equally applicable to an embodiment where the communications network 200 comprises more than two base stations 201.

The method comprises the further steps to be performed by the first base station 201a, which steps may be performed in any suitable order:

Step 601

In some embodiments, the first base station 201a transmits, to the second base station 201b, coordination information associated with the first PDCCH 210a between the first base station 201a and the first user equipment 205a. The second base station 201b uses the coordination information to control interference on the first PDCCH 210a.

The coordination information transmitted to the second base station 201b comprises at least one of a cell index, a number of resource blocks, a number of sub-carriers per resource block, a number of antenna ports at the first base station, a CFI, a cyclic prefix, a PHICH duration, a PHICH nG factor and a duplex mode. All these parameters are associated with the first base station 201a and the first PDCCH 210a.

The first user equipment 205a may comprise one first user equipment 205a or a plurality of first user equipment's 205a. Therefore, even though this description explains allocating of PDCCH resources made by one first user equipment 205a, it is also applicable to a scenario when a plurality of first user equipments 205a allocates PDCCH resources.

Step 602

The first base station 201a receives, from the second base station 201b, coordination information associated with the second PDCCH 210b. The coordination information received from the second base station 201b may comprise information about a configuration of the second PDCCH 210b.

The coordination information received from to the second base station 201b comprises at least one of a cell index, a number of resource blocks, a number of sub-carriers per resource block, a number of antenna ports at the first base station, a CFI, a cyclic prefix, a PHICH duration, a PHICH nG factor and a duplex mode. All these parameters are associated with the second base station 201b and the second PDCCH 210b.

There are several alternative embodiments for the exchange of coordination information in steps 601 and 602. In order to avoid interference by considering the PDCCH configuration of another base station 201, the coordination information must be exchanged prior to transmission (in all base stations 201 using this scheme) which may imply that both steps 601 and 602 are required prior to the control and the transmission in steps 603 and 604 since all base stations 201 using this method has to exchange coordination information prior to transmitting the uplink grant and/or the downlink assignment and/or the uplink TPC command. In some embodiments, partitions of user RNTIs are created that may be co-scheduled in different cells 203 without causing interference. The RNTI and coordination information may then together specify which potential CCEs that may be transmitted, which in turn (together with coordination information) may specify which radio resource elements these corresponds to which makes it possible to reduce/avoid the interference.

The coordination information may be partitions of CCEs that may be co-scheduled with limited PDCCH-to-PDCCH interference and/or partitions of RNTIs that may be co-scheduled with limited PDCCH-to-PDCCH interference.

The coordination information transmitted and received in steps 601 and 602 is transmitted and received as system information in some of the different System Information Blocks (SIB), and it is not changed very often.

Step 603

Figure 4:
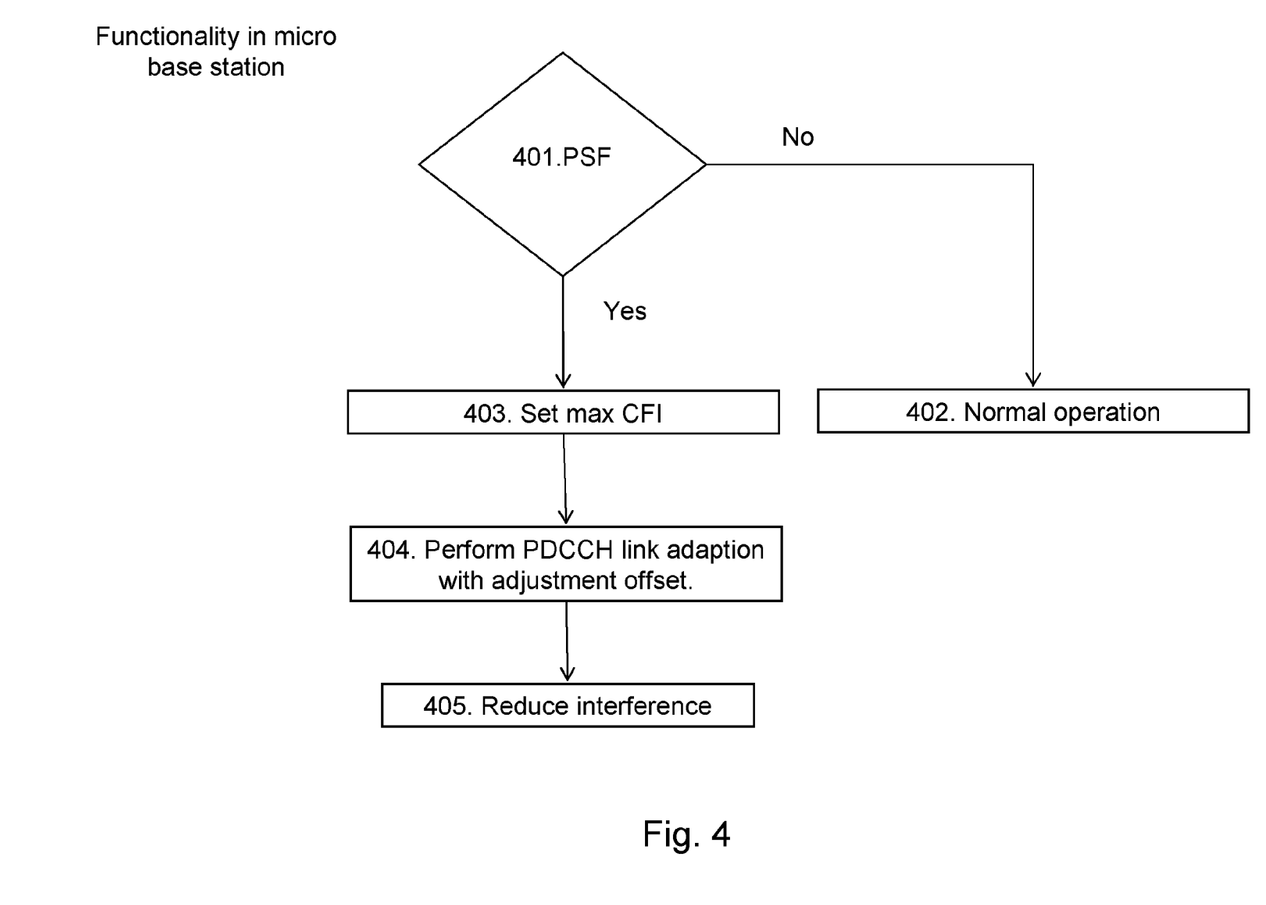
FIG. 4 is a flow chart illustrating embodiments of a micro operation.
Figure 5:
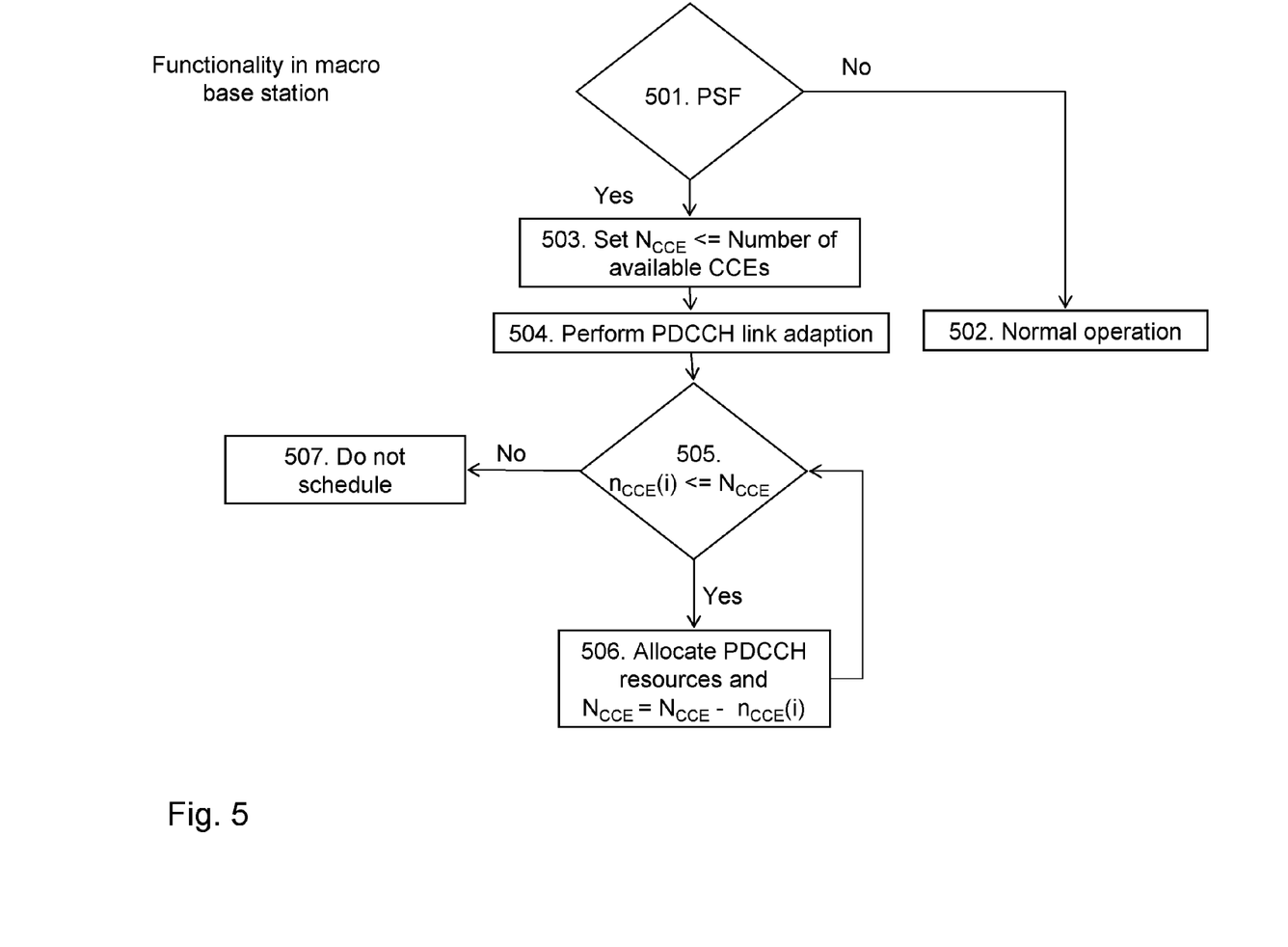
FIG. 5 is a flow chart illustrating embodiments of a macro operation.

This step corresponds to step 306 in FIG. 3, step 405 in FIG. 4 and steps 505 and 507 in FIG. 5.

Based on the received coordination information, the first base station 201a controls the interference on the second PDCCH 210b. The interference is caused by a first PDCCH 210a from the first base station 201a to a first user equipment 205a. The control of the interference may be a reduction of the interference on the second PDCCH 210b or avoiding of the interference on the second PDCCH 210b.

The interference may be further caused by a first PDSCH from the first base station 201a to a first user equipment 205a. The interference on the second PDCCH 210b is controlled by restricting the transmission of the first PDSCH on the bandwidth or by transmitting the first PDSCH with a reduced power.

With the coordination information the first base station 201a knows which radio resources (in time/frequency) the second base station 201b is likely to transmit on. Thus, transmission on resources that have high probability of being used by the second base station 201b may be avoided. However, if the first base station 201a and the second base station 201b exchange coordination information and/or CCE allocation patters prior to the scheduling process it may be possible to make a joint scheduling of the two nodes.

Control of the interference is crucial for successfully reception of control information. Control of the interference will give a higher SINR, and a higher SINR increase the probability of successfully receiving the transmitted control information.

The coordination information is used to avoid interference by selecting PDCCH candidates corresponding to CCEs that are less interfering.

The coordination information related to the configuration of the first base station 201a and the second base station 201b is exchanged in steps 601 and 602. An inverse radio resource mapping function for the interfering base station 201 is calculated and observed/used at scheduling in order to avoid interference. This may also be seen as avoiding scheduling of the user equipment 205 that creates a lot of interference with another base stations 201 PDCCH transmission.

Step 603a

This step is a substep of step 603. This step corresponds to steps 301, 303 and 304 in FIG. 3 and steps 401 and 403 in FIG. 4.

In some embodiments, the first base station 201a sets the CFI to a first value.

In some embodiments, the first value corresponds to a minimum number of OFDM symbols for the first PDCCH 210a, as illustrated in step 303 in FIG. 3.

In some embodiments, the first value corresponds to a maximum number of OFDM symbols for the first PDCCH 210a, as illustrated in step 403 in FIG. 4.

The CFI may be set to the first value when a subframe in which the first base station 201a is configured to transmit to the first user equipment 205a on the first PDCCH 210a is a PSF. Information about the PSF may be a predefined system constant or a constant which is changed dynamically and is comprised in the coordination information.

In some embodiments, the CFI is set to the first value when a subframe in which the first base station 201a is configured to transmit to the first user equipment 205a on the first PDCCH 210a is the subframe in which the second PDCCH 210b is sensitive or resilient to interference. The interference is caused by the first transmission from the first base station 201a on the first PDCCH 210a to the first user equipment 205a. The embodiments herein are applied to the sensitive subframes.

Step 603b

This step is a substep of step 603, and a step that is performed after step 603a. This step corresponds to step 305 in FIG. 3 and step 404 in FIG. 4. In some embodiments, the first base station 201a performs link adaptation of the first PDCCH 210a.

In some embodiments, the link adaptation is performed when the first base station 201a is configured to schedule an uplink grant and/or a downlink assignment and/or an uplink TPC command to the first user equipment 205a. The scheduling may be seen as to be based on the CFI since the CFI sets a limitation on which OFDM symbols the PDCCH is transmitted on and how many user equipments 205 that are scheduled. This is also illustrated in step 304 in FIG. 3.

The link adaptation may be further based on an adjustment offset. The adjustment offset may be associated with at least one of a number of CCEs and the SINR. The adjustment offset may be fixed or dynamic and they may be varying in different subframes. This is also illustrated in step 404 in FIG. 4.

Step 603c

This is a substep of step 603. This step corresponds to step 503 and step 504 in FIG. 5.

In some embodiments, the first base station 201a determines a number of Control Channel Elements, CCEs, i.e. $N_{CCE}$.

In some embodiments, the number of CCEs is lower than or equal to a total number of available CCEs.

In some embodiments, the number of CCEs is dependent on at least one of a system bandwidth, the CFI, configured cyclic prefix and information about a PHICH configuration.

Step 604

In some embodiments, the first base station 201a transmits downlink control information to the first user equipment 205a based on the performed link adaptation of the first PDCCH 210a. In some embodiments, the first PDCCH 210a is transmitted on CCEs comprised in the determined number of CCEs, determined in step 603c.

The transmission is performed by deliberately transmitting on radio resources which reduces the number of radio resource collisions/interference exposed on the sent control information.

As mentioned above, the number of CCEs in the step 603 is lower than or equal to the number of available CCEs. This is also the same for the determined number of CCEs in step 604, i.e. it is lower than or equal to the number determined in step 603c. The number of CCEs, i.e. $N_{CCE}$, is the number of CCEs that is allowed to be used (less or equal to number of available CCEs). The $N_{CCE}$ is reduced each time a user equipment 205 gets PDCCH resources. When a user equipment 205a should be scheduled, a link adaptation is done to determine number of CCEs that is needed, and if this number is less than current value of $N_{CCE}$ the user equipment 205 may get allocated PDCCH resources with this (link adaptation is selected) number of CCEs. If the link adaptation selected number of CCEs exceeds $N_{CCE}$ then there are two options:

i) Do not allocate PDCCH resource to the user equipment 205.
ii) Allocate PDCCH resources with less or equal to the $N_{CCE}$ number of CCEs.

When the first user equipment 205a is a plurality of first user equipment's 205a, the sum of CCEs for the plurality of first user equipments 205a is lower or equal to the number of CCEs in the number determined in step 603c.

Figure 7:
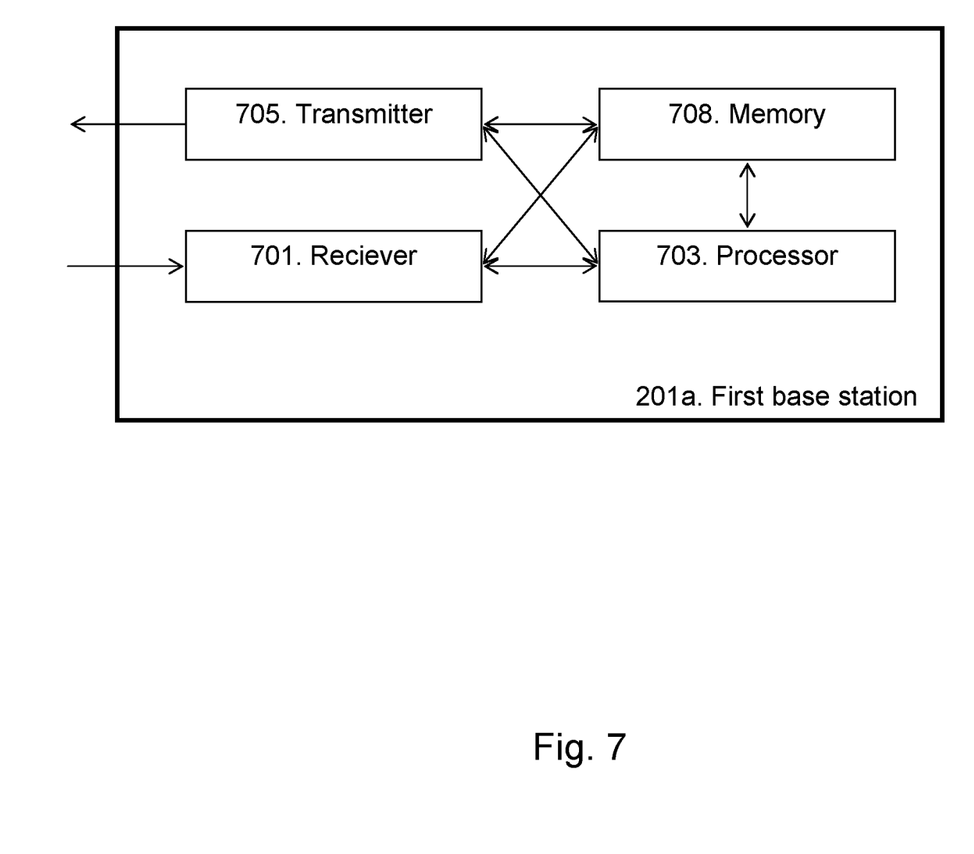
FIG. 7 is a flow chart illustrating embodiments of a first base station.

To perform the method steps shown in FIG. 6 for controlling interference on a second PDCCH 210b, the first base station 201a comprises an arrangement as shown in FIG. 7. As mentioned above, the second PDCCH 210b is between the second base station 201b and the second user equipment 205b. In some embodiments, the first base station 201a is a macro base station and the second base station 201b is a micro base station.

In some embodiments the first base station 201a is a micro base station and the second base station 201b is a macro base station. The first user equipment 205a may comprise one first user equipment or a plurality of first user equipment's.

The first base station 201a comprises a receiver 701 which is configured to receive, from the second base station 201b, coordination information associated with the second PDCCH 210b. In some embodiments, the coordination information received from the second base station 201b comprises information about a configuration of the second PDCCH 210b. The coordination information may comprise the pattern of PSF and non-PSF.

The first base station 201a comprises a processor 703 which is configured to, based on the received coordination information, control the interference on the second PDCCH 210b. The interference is caused by the first PDCCH 210a from the first base station 201a to the first user equipment 205a. The processor 703 may be further configured to set the CFI to the first value, and to perform link adaptation of the first PDCCH 210a. The CFI determines the size of the control region. The first value may correspond to a minimum number of OFDM symbols for the first PDCCH 210a. In some embodiments, the first value corresponds to a maximum number of OFDM symbols for the first PDCCH 210a. In some embodiments, the CFI is set to the first value when a subframe in which the first base station 201a is configured to transmit to the first user equipment 205a on the first PDCCH 210a is a PSF. In some embodiments, the CFI is set to the first value when a subframe in which the first base station 201a is configured to transmit to the first user equipment 205a on the first PDCCH 210a is the subframe in which the second PDCCH 210b is sensitive to interference, i.e. a PSF. Here, PSF may not be the same as ABS/RPS. PSF is defined in a wider sense compared to ABS/RPS. In a standalone scenario there is still a coordination pattern indicating in which subframes the interference should be reduced/avoided. Those subframes are referred to as PSF. To clarify, PSF_ABS and PSF_RPS indicate a coordination pattern according to ABS/RPS.

The interference is caused by the first transmission from the first base station 201a on the first PDCCH 210a to the first user equipment 205a.

The processor 703 may be configured to perform the link adaptation when the first base station 201a is configured to schedule uplink grant and/or downlink assignment and/or an uplink TPC command to the first user equipment 205a. The scheduling of an uplink grant and/or downlink assignment and/or an uplink TPC command is based on the CFI set by the processor 703. In some embodiments, the link adaptation is further based on the adjustment offset. The adjustment offset may be associated with at least one of the number of CCEs and the SINR. The adjustment offset may be fixed or dynamic and varying in different subframes. In some embodiments, the processor 703 is further configured to determine a number of CCEs. The scheduling may be seen as to be based on the CFI since the CFI sets a limitation on which OFDM symbols the PDCCH is transmitted on and how many user equipments 205 that are scheduled.

The processor 703 may be further configured to, based on the received coordination information, reduce the interference on the second PDCCH 210b or avoid the interference on the second PDCCH 210b.

In some embodiments, the first base station 201a comprises a transmitter 705 configured to transmit downlink control information to the first user equipment 205a based on the performed link adaptation of the first PDCCH 210a. In some embodiments, the first PDCCH 210a is transmitted on CCEs comprised in the determined number of CCEs. The number of CCEs may be lower than or equal to a total number of available CCEs. The number of CCEs is dependent on at least one of a system bandwidth, a CFI, configured cyclic prefix and information about a PHICH configuration.

In some embodiments, the transmitter 705 is configured to transmit, to the second base station 201b, coordination information associated with the first PDCCH 210a between the first base station 201a and the first user equipment 205a. The coordination information received from the second base station 201b and the coordination information transmitted to the second base station 201b each comprises at least one of a cell index, a number of resource blocks, a number of sub-carriers per resource block, a number of antenna ports at the first base station, a CFI, a cyclic prefix, a PHICH duration, a PHICH nG factor and a duplex mode.

The first base station 201a may further comprise a memory 708 comprising one or more memory units. The memory 708 is arranged to be used to store data, received and transmitted data coordination information, interference measurements, power level measurements, CFI, the first value, threshold values, downlink control information, adjustment offset, CCE, SINR, minimum and maximum number of OFDM symbols, number of CCEs, PHICH configuration information, configuration information of the first and second PDCCH, time periods, configurations, schedulings, and applications to perform the methods herein when being executed in the first base station 201a.

The present mechanism for controlling interference on a second PDCCH 210b may be implemented through one or more processors, such as the processor 703 in the first base station 201a depicted in FIG. 7, together with computer program code for performing the functions of the embodiments herein. The processor may be for example a Digital Signal Processor (DSP), Application Specific Integrated Circuit (ASIC) processor, Field Programmable Gate Array (FPGA) processor or microprocessor. The program code mentioned above may also be provided as a computer program product, for instance in the form of a data carrier carrying computer program code for performing the embodiments herein when being loaded into the first base station 201a. One such carrier may be in the form of a CD ROM disc. It is however feasible with other data carriers such as a memory stick. The computer program code may furthermore be provided as pure program code on a server and downloaded to the first base station 201a.

Those skilled in the art will also appreciate that the receiver 701 and transmitter 705 described above may refer to a combination of analog and digital circuits, and/or one or more processors configured with software and/or firmware, e.g. stored in the memory 708, that when executed by the one or more processors such as the processor 703 perform as described above. One or more of these processors, as well as the other digital hardware, may be included in a single ASIC, or several processors and various digital hardware may be distributed among several separate components, whether individually packaged or assembled into a System-on-a-Chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a first base station for controlling interference on a second Physical Downlink Control CHannel (PDCCH), wherein the second PDCCH is between a second base station and a second user equipment, the method comprising:
receiving, from the second base station, coordination information associated with the second PDCCH, wherein the coordination information received from the second base station comprises information about a configuration of the second PDCCH;
based on the received coordination information, controlling the interference on the second PDCCH, wherein the interference is caused by a first PDCCH from the first base station to a first user equipment and further caused by a first Physical Downlink Shared CHannel (PDSCH) from the first base station to the first user equipment, and wherein the interference on the second PDCCH is controlled by restricting transmission of the first PDSCH on a bandwidth or by transmitting the first PDSCH with a reduced power; and
transmitting, to the second base station, coordination information associated with the first PDCCH between the first base station and the first user equipment, wherein the coordination information received from the second base station and the coordination information transmitted to the second base station, each comprises at least one of a cell index, a number of resource blocks, a number of sub-carriers per resource block, a number of antenna ports at the first base station, a Control Format Indicator (CFI), a cyclic prefix, a Physical Hybrid Automatic Repeat-reQuest Indicator CHannel (PHICH) duration, a PHICH nG factor, and a duplex mode.

2. The method of claim 1, wherein controlling the interference comprises performing link adaptation of the first PDCCH, and wherein the method further comprises transmitting downlink control information to the first user equipment based on the performed link adaptation of the first PDCCH.

3. The method of claim 2, wherein controlling the interference further comprises setting the CFI to a first value, and wherein the link adaptation is performed when the first base station is configured to schedule an uplink grant and/or a downlink assignment and/or an uplink transmission power control command to the first user equipment, wherein the scheduling is based on the CFI.

4. The method of claim 2, wherein the link adaptation is further based on an adjustment offset.

5. The method of claim 4, wherein the adjustment offset is associated with at least one of a number of Control Channel Elements (CCEs) and a Signal to Interference plus Noise Ratio (SINR).

6. The method of claim 4, wherein the adjustment offset is fixed or wherein the adjustment offset is dynamic and varying in different subframes.

7. The method of claim 3, wherein the first value corresponds to a minimum number of Orthogonal Frequency Division Multiplexing (OFDM) symbols for the first PDCCH.

8. The method of claim 3, wherein the first value corresponds to a maximum number of Orthogonal Frequency Division Multiplexing (OFDM) symbols for the first PDCCH.

9. The method of claim 3, wherein the CFI is set to the first value when a subframe in which the first base station is configured to transmit to the first user equipment on the first PDCCH is a Protected SubFrame (PSF).

10. The method of claim 3, wherein the CFI is set to the first value when a subframe in which the first base station is configured to transmit to the first user equipment on the first PDCCH is the subframe in which the second PDCCH is sensitive to an interference, wherein the interference is caused by a first transmission from the first base station on the first PDCCH to the first user equipment.

11. The method of claim 1, wherein controlling the interference further comprises:
determining a number of Control Channel Elements (CCEs); and
transmitting downlink control information to the first user equipment on the first PDCCH, wherein the first PDCCH is transmitted on CCEs comprised in the determined number of CCEs.

12. The method of claim 11, wherein the number of CCEs is lower than or equal to a total number of available CCEs.

13. The method of claim 12, wherein the total number of available CCEs is dependent on at least one of a system bandwidth, a CFI configured cyclic prefix, and information about a PHICH configuration.

14. The method of claim 1, wherein the first base station is a macro base station and the second base station is a micro base station, or wherein the first base station is a micro base station and the second base station is a macro base station.

15. The method of claim 1, wherein controlling the interference on the second PDCCH comprises, based on the received coordination information, reducing the interference on the second PDCCH or avoiding the interference on the second PDCCH.

16. The method of claim 1, wherein the first user equipment comprises one first user equipment or a plurality of first user equipments.

17. A first base station for controlling interference on a second Physical Downlink Control CHannel (PDCCH), wherein the second PDCCH is between a second base station and a second user equipment, the first base station comprising:
a receiver configured to receive, from the second base station, coordination information associated with the second PDCCH, wherein the coordination information received from the second base station comprises information about a configuration of the second PDCCH;
a processor configured to, based on the received coordination information, control the interference on the second PDCCH, wherein the interference is caused by a first PDCCH from the first base station to a first user equipment and further caused by a first Physical Downlink Shared CHannel (PDSCH) from the first base station to the first user equipment and wherein the interference on the second PDCCH is controlled by restricting transmission of the first PDSCH on a bandwidth or by transmitting the first PDSCH with a reduced power; and
a transmitter configured to transmit, to the second base station, coordination information associated with the first PDCCH between the first base station and the first user equipment, wherein the coordination information received from the second base station and the coordination information transmitted to the second base station each comprises at least one of a cell index, a number of resource blocks, a number of sub-carriers per resource block, a number of antenna ports at the first base station, a Control Format Indicator (CFI), a cyclic prefix, a Physical Hybrid Automatic Repeat-reQuest Indicator CHannel (PHICH) duration, a PHICH nG factor, and a duplex mode.

18. The first base station of claim 17, wherein the processor is further configured to:
perform link adaptation of the first PDCCH based on the CFI; and
wherein the transmitter is further configured to transmit downlink control information to the first user equipment based on the performed link adaptation of the first PDCCH.

19. The first base station of claim 18, wherein the processor is configured to:
set the CFI to a first value; and
perform the link adaptation when the first base station is configured to schedule an uplink grant and/or a downlink assignment and/or an uplink transmission power control command to the first user equipment, wherein the scheduling is based on the CFI.

20. The first base station of claim 18, wherein the link adaptation is further based on an adjustment offset.

21. The first base station of claim 20, wherein the adjustment offset is associated with at least one of a number of Control Channel Element (CCEs) and a Signal to Interference plus Noise Ratio (SINR).

22. The first base station of claim 20, wherein the adjustment offset is fixed or wherein the adjustment offset is dynamic and varying in different subframes.

23. The first base station of claim 19, wherein the first value corresponds to a minimum number of Orthogonal Frequency Division Multiplexing (OFDM) symbols for the first PDCCH.

24. The first base station of claim 19, wherein the first value corresponds to a maximum number of Orthogonal Frequency Division Multiplexing (OFDM) symbols for the first PDCCH.

25. The first base station of claim 19, wherein the CFI is set to the first value when a subframe in which the first base station is configured to transmit to the first user equipment on the first PDCCH is a Protected SubFrame (PSF).

26. The first base station of claim 19, wherein the CFI is set to the first value when a subframe in which the first base station is configured to transmit to the first user equipment on the first PDCCH is the subframe in which the second PDCCH is sensitive to an interference, wherein the interference is caused by a first transmission from the first base station on the first PDCCH to the first user equipment.

27. The first base station of claim 17, wherein the processor is further configured to determine a number of Control Channel Elements (CCEs); and wherein the transmitter is further configured to transmit downlink control information to the first user equipment on the first PDCCH, wherein the first PDCCH is transmitted on CCEs comprised in the determined number of CCEs.

28. The first base station of claim 27, wherein the number of CCEs is lower than or equal to a total number of available CCEs.

29. The first base station of claim 28, wherein the total number of available CCEs is dependent on at least one of a system bandwidth, a CFI configured cyclic prefix, and information about a PHICH configuration.

30. The first base station of claim 17, wherein the first base station is a macro base station and the second base station is a micro base station, or wherein the first base station is a micro base station and the second base station is a macro base station.

31. The first base station of claim 17, wherein the processor is further configured to, based on the received coordination information, reduce the interference on the second PDCCH or avoid the interference on the second PDCCH.

32. The first base station of claim 17, wherein the first user equipment comprises one first user equipment or a plurality of first user equipments.

* * * * *